United States Patent [19]

Itoh

[11] Patent Number: 4,486,794
[45] Date of Patent: Dec. 4, 1984

[54] HEAD SERVO CIRCUIT IN A MAGNETIC REPRODUCING APPARATUS

[75] Inventor: Kenji Itoh, Yokohama, Japan

[73] Assignee: Victor Company of Japan, Ltd., Kanagawa, Japan

[21] Appl. No.: 414,294

[22] Filed: Sep. 2, 1982

[30] Foreign Application Priority Data

Sep. 7, 1981 [JP] Japan .................. 56-140800

[51] Int. Cl.³ ................ G11B 15/44; G11B 21/04
[52] U.S. Cl. ..................... 360/70; 360/10.3
[58] Field of Search ............. 360/10.1, 10.2, 10.3, 360/70, 75

[56] References Cited

U.S. PATENT DOCUMENTS 3,270,130  8/1966  Hurst et al. ................ 360/70
3,398,235  8/1968  Baldwin et al. ............. 360/70
3,729,583  4/1973  Yano ........................ 360/75

FOREIGN PATENT DOCUMENTS 3225888  2/1983  Fed. Rep. of Germany.

Primary Examiner—George G. Stellar
Attorney, Agent, or Firm—Michael N. Meller

[57] ABSTRACT

A head servo circuit in a magnetic reproducing apparatus comprising rotary heads for reproducing a video signal recorded on tracks formed obliquely with respect to the longitudinal direction of a magnetic tape, a motor for rotating the rotary heads, and a magnetic tape traveling circuit for causing the magnetic tape to travel at a high speed during a high-speed reproduction mode and causing the magnetic tape to travel at a speed in accordance with a mode as the mode is switched over to a mode other than the high-speed reproduction mode, comprises a detecting circuit for detecting the rotation of the motor and producing a signal in accordance with the detected rotation, a reference frequency signal generating circuit for generating a reference frequency signal, a phase comparing circuit for comparing phases of the reference frequency signal generated by the reference frequency signal generating circuit and the signal from the detecting circuit, a control circuit for controlling the rotation of the motor by an output signal of the phase comparing circuit during a mode other than the high-speed reproduction mode, a cut off circuit for cutting off the supply of the output signal of the phase comparing circuit to the control circuit during the high-speed reproduction mode, and a synchronizing circuit for obtaining phase synchronism between the reference frequency signal generated by the reference frequency signal generating circuit and the signal from the detecting circuit during the high-speed reproduction mode.

5 Claims, 2 Drawing Figures

HEAD SERVO CIRCUIT IN A MAGNETIC REPRODUCING APPARATUS

BACKGROUND OF THE INVENTION

The present invention generally relates to head servo circuits in magnetic reproducing apparatuses, and more particularly to a head servo circuit designed so that a head servo system for controlling the rotational speed of rotary heads locks in instantaneously or locks in within an exceedingly short period of time when a mode of a magnetic reproducing apparatus is switched over to normal reproduction mode from high-speed reproduction mode.

In a magnetic recording and reproducing apparatus which records and reproduces a video signal onto and from tracks formed obliquely on a magnetic tape with respect to the longitudinal direction o the magnetic tape, recording positions of a vertical synchronizing signal of the video signal must be aligned at end parts of the oblique and parallel recording tracks upon recording. On the other hand, upon reproduction, rotary heads must accurately scan over the above recording tracks. Hence, in this type of a so-called helical scan type magnetic recording and reproducing apparatus (hereinafter simply referred to as a magnetic recording and reproducing apparatus), a head servo circuit is generally provided. This head servo circuit comprises a speed control loop for controlling the rotational speed of the rotary heads, and a phase control loop for controllingg the rotational phase of the rotary heads.

In the above magnetic recording and reproducing apparatus, high-speed search reproduction can be performed to search for a predetermined recording position. During the high-speed search reproduction, the magnetic tape is cauded to travel in the same direction as upon recording (forward direction) or in a reverse direction at a high speed on the order of ten times the tape traveling speed upon normal reproduction, for example. Because the magnetic tape travels at a high speed in the forward or reverse direction during the high-speed search reproduction as described above, the relative scanning linear speed between the rotary heads and the magnetic tape during the high-speed search reproduction differs with that upon normal reproduction. Accordingly, the horizontal scanning frequency of the reproduced video signal upon high-speed search reproduction differs from the regular horizontal scanning frequency upon normal reproduction. Thus, if the reproduced signal obtained during the high-speed search reproduction is supplied to a television receiver, the reproduced picture will be out of horizontal synchronism, and a regular reproduced picture cannot be obtained.

Therefore, in order to obtain a reproduced picture in horizontal synchronism even during the high-speed search reproduction, it becomes necessary to carry out reproduction so that the horizontal scanning frequency of the reproduced video signal becomes the same as the horizontal scanning frequency upon normal reproduction (15.734 kHz when the video signal is an NTSC system color video signal, for example). In order to achieve this, it becomes necessary to rotate the rotary heads at an increased or decreased speed compared to the speed upon normal reproduction according to the direction of the tape travel, during the high-speed search reproduction. That is, if the tape traveling direction during the high-speed search reproduction is the same as the tape traveling direction (forward direction) upon normal reproduction, the rotary heads must be rotated at a rotational speed higher than that upon normal reproduction. On the other hand, if the tape traveling direction is in the reverse direction during the high-speed search reproduction, the rotary heads must be rotated at a rotational speed lower than that upon normal reproduction. Hence, in the above head servo circuit, the phase control loop is cut off during the high-speed search reproduction, and moreover, a voltage obtained subjecting the horizontal scanning frequency of the horizontal synchronizing signal to frequency-to-voltage conversion is applied to a motor (hereinafter referred to as a head motor) for rotating the rotary heads. Hence, the rotational speed of the rotary heads is controlled so that the relative scanning linear speed between the rotary heads and the magnetic tape is the same as that upon normal reproduction during the high-speed search reproduction.

However, in the phase control loop of the above head servo circuit, the frequency and phase of a reference signal used for obtaining a phase error signal are the same during the normal reproduction and the high-speed search reproduction. On the other hand, the frequency and phase of a phase comparison signal detected according to the rotation of the rotary heads and compared with the above reference signal in order to obtain the phase error signal, differ during the normal reproduction and the high-speed search reproduction. As a result, in the conventional head servo circuit, when the mode of the magnetic recording and reproducing apparatus is switched over to the normal reproduction mode from the high-speed search reproduction mode, the relationship between the frequency and phase of the phase error signal and the frequency and phase of the reference signal becomes unstable, and the phase control loop does not lock-in instantaneously. Thus, there was a disadvantage in that it takes a time on the order of one to several seconds for the phase control loop to lock-in from the point in time when the mode is switched over, and regular reproduction of the picture could not be carried out during the time it takes for the phase control loop to lock-in.

SUMMARY OF THE INVENTION

Accordingly, it is a general object of the present invention to provide a novel and useful head servo circuit in a magnetic reproducing apparatus, in which the above described disadvantages have been overcome.

Another and more specific object of the present invention is to provide a head servo circuit designed so that the phase of a reference signal used for phase comparison during high-speed search reproduction matches with the phase of a rotation detection signal detected according to the rotational speed of rotary heads. According to the circuit of the present invention, if the mode of the reproducing apparatus is switched over to the normal reproduction mode which uses a phase control loop from the high-speed search reproduction mode which does not use the phase control loop, the phase control loop locks in immediately. Thus, a regular normal reproduction picture can be obtained immediately after the mode of the reproducing apparatus is switched over as described above.

Other objects and further features of the present invention will be apparent from the following detailed

DETAILED DESCRIPTION

Figure 1:
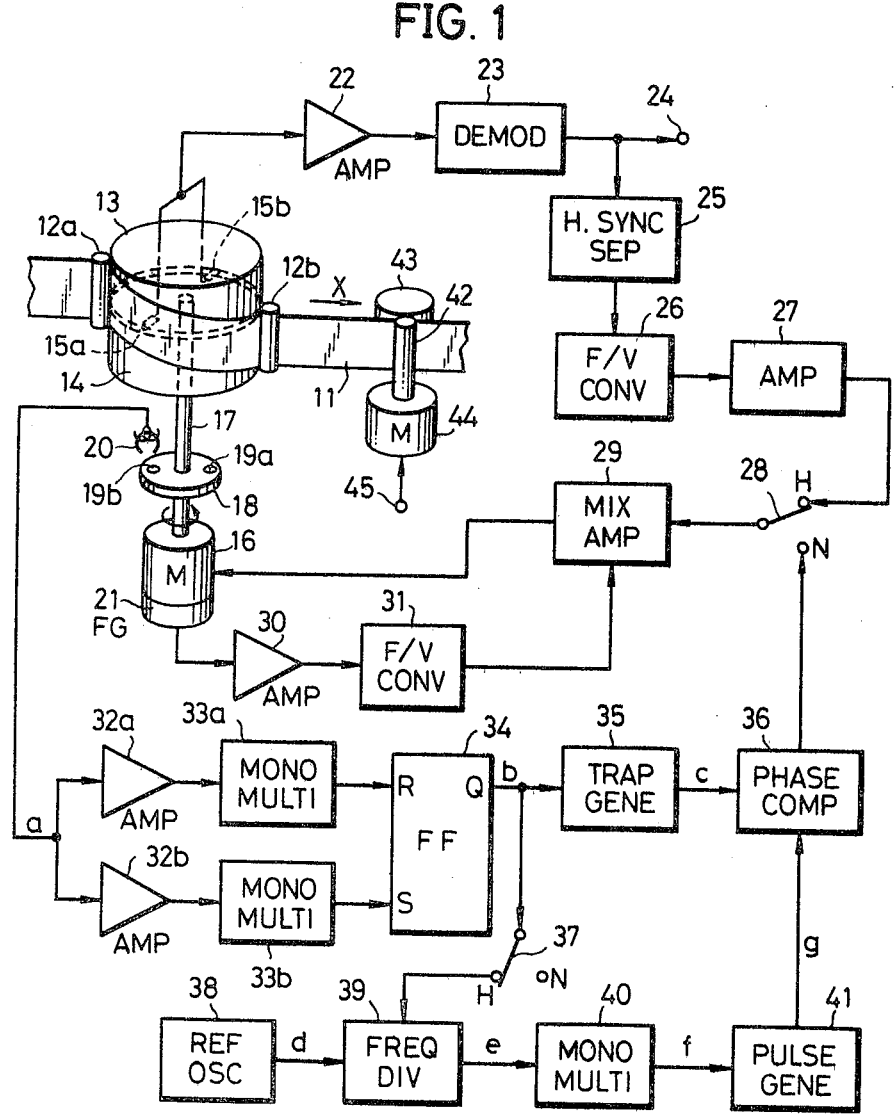
FIG. 1 is a systematic block diagram showing an embodiment of a head servo circuit in a magnetic reproducing apparatus according to the present invention.

In FIG. 1, a magnetic tape 11 is guided by guide poles 12a and 12b, and wrapped obliquely around peripheral surfaces of a rotary drum 13 and a stationary drum 14, throughout an angular range slightly over 180°. this magnetic tape 11 is pinched between a capstan 42 and a pinch roller 43, and caused to travel in the direction of an arrow X during normal reproduction due to the rotation of the capstan 42 which is rotated by a capstan motor 44. For example, a frequency-modulated video signal is recorded on tracks formed obliquely with respect to the longitudinal direction of the magnetic tape 11. In addition, a control pulse having a constant period is recorded on a control track formed at a predetermined position along the longitudinal direction of the magnetic tape 11. One field of video signal is recorded on each oblique track on the magnetic tape 11. Rotary heads 15a and 15b are mounted on the rotary drum 13 opposing each other along the diametral direction of the rotary drum 13. The rotary heads 15a and 15b alternately scan over the oblique tracks on the magnetic tape 11.

A rotary shaft 17 of a drum motor 16 passes through a center part of the stationary drum 14, and is coaxially fixed at a center part of the rotary drum 13. A disc 18 is fixed at a part of the rotary shaft 17, in a state where the rotary shaft 17 passes through a center part of the disc 18. When the drum motor 16 rotates, the rotary drum 13 and the disc 18 rotate unitarily. Magnets 19a and 19b are respectively provided on the disc 18, at mutually opposing positions along the diametral direction of the disc 18. The rotational phase of the drum motor 16 is detected by a pickup head 20 and magnets 19a and 19b. Phase detection signals of mutually different polarities are alternately and respectively obtained from the pickup head 20.

First, a description will be given with respect to the operation during a high-speed search reproduction mode. During the high-speed search reproduction mode, movable contacts of switches 28 and 37 are connected to respective terminals H. A voltage for the high-speed search reproduction mode is applied to a capstan motor 44 from a terminal 45, to rotate the capstan motor 44 at a high speed. As a result, the magnetic tape 11 is caused to travel at a high-speed which is approximately ten times the tape traveling speed upon normal reproduction. During the above high-speed search reproduction mode, it is also possible to cause the magnetic tape 11 to travel at a high speed, by separating the pinch roller 43 from the capstan 42 and taking up the magnetic tape 11 by rotating a take-up reel or a supply reel.

The video signal reproduced by the rotary heads 15a and 15b is supplied to a demodulator 23 through an amplifier 22, and demodulated at the demodulator 23. The demodulated output of the demodulator 23 is obtained through a terminal 24, and supplied to a receiver. On the other hand, the above demodulated output is also supplied to a horizontal synchronizing signal separating circuit 25 wherein a horizontal synchronizing signal is separated. The separated horizontal synchronizing signal is supplied to a frequency-to-voltage (F/V) converter 26 and converted into a voltage in accordance with the frequency of the separated horizontal synchronizing signal. An output voltage of the F/V converter 26 is applied to the terminal H of the switch 28, through an amplifier 27. Because the switch 28 is connected to the terminal H, the above output voltage of the F/V converter 26 is supplied to a mixing amplifier 29.

A frequency generator 21 is provided in the drum motor 16, and a signal having a frequency in accordance with the rotational speed of the drum motor 16 is obtained from the frequency generator 21. This output frequency signal is supplied to a frequency-to-voltage (F/V) converter 31 through an amplifier 30, and coverted into a voltage in accordance with the frequency of the above output frequency signal. An output voltage of the F/V converter 31 is then supplied to the mixing amplifier 29, and mixed with the voltage obtained through the switch 28. An output signal of the mixing amplifier 29 is applied to the drum motor 16 to control the rotational speed of the drum motor 16. The above loop constitutes a speed control loop.

Accordingly, the rotational speed and the rotational phase of the drum motor 16 are controlled so that a relative scanning linear speed between the rotary heads 15a and 15b and the tracks on the magnetic tape 11, which is caused to travel at a speed higher than that upon normal reproduction, becomes equal to the relative scanning linear speed upon normal reproduction. When the magnetic tape 11 is caused to travel in the direction of the arrow X which is the same as the direction of tape travel upon normal reproduction, the rotational speed of the drum motor 16 is controlled to become higher than the rotational speed upon normal reproduction. On the other hand, if the magnetic tape 11 is caused to travel in a direction opposite to the direction of the arrow X, the rotational speed of the drum motor 16 is controlled to become lower than the rotational speed upon normal reproduction.

Figure 2:
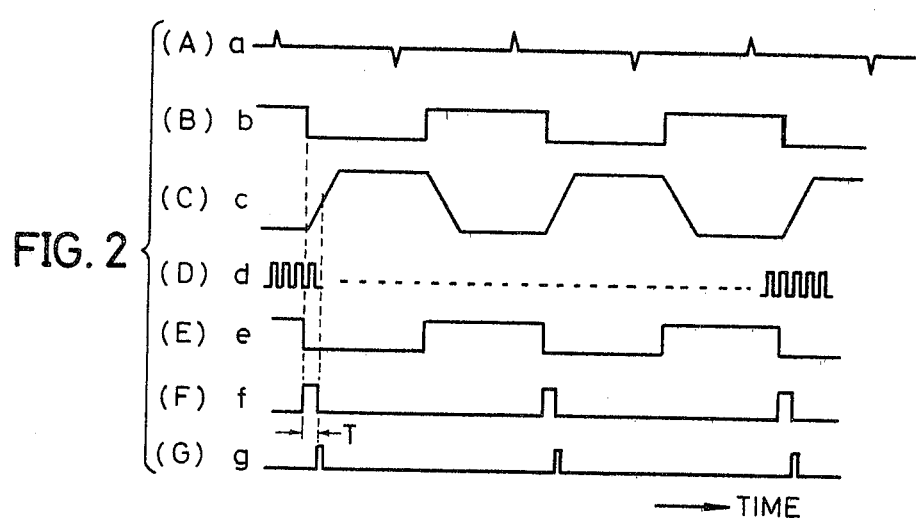
FIGS. 2(A) through 2(G) are graphs respectively showing the signal waveform at each part of the block system shown in FIG. 1.

A phase detection signal a shown in FIG. 2(A), which is detected at the pickup head 20, is supplied to monostable multivibrators 33a and 33b through respective amplifiers 32a and 32b, and delayed by predetermined time periods. Output signals of the monostable multivibrators 33a and 33b are respectively applied to a reset terminal R and a set terminal S of a reset-and-set (R-S) flip-flop 34, to successively reverse the stable state of the flip-flop 34. Thus, a square wave signal b shown in FIG. 2(B) is obtained from the flip-flop 34. The inverting period of the square wave signal b corresponds to each track scanning period of the rotary heads 15a and 15b.

The above square wave signal b is also supplied to a trapezoidal wave generator 35. A trapezoidal wave c shown in FIG. 2(C) is hence obtained from the trapezoidal wave generator 35 and supplied to a phase comparator (sample-and-hold circuit) 36.

On the other hand, the square wave signal b is applied to a reset terminal of a frequency divider 39 comprising a counter as a reset signal, through the switch 37 connected to the terminal H. A reference frequency signal d shown in FIG. 2(D), having a frequency of 32 kHz, for example, is obtained from a reference signal oscillator 38. This reference frequency signal d is frequency-divided into a frequency signal of 30 Hz at the frequency divider 39. Because the frequency divider 39 is reset by the above square wave signal b, a frequency-divided signal e shown in FIG. 2(E), which falls in synchronism with the rise in the square wave signal b, is obtained from the frequency divider 39. Accordingly, the above frequency-divided signal e is in phase synchronism with the square wave signal b.

The above frequency-divided signal e is supplied to a monostable multivibrator 40 and delayed by a predetermined time period T. Thus, a signal f shown in FIG. 2(F) is obtained from the monostable multivibrator 40. The signal f is supplied to a pulse generator 41. The pulse generator 41 generates a sampling pulse g shown in FIG. 2(G) at a rising point of the signal f. The above sampling pulse g is supplied to the phase comparator 36, to sample the voltage at the sloping part of the trapezoidal wave c obtained from the trapezoidal wave generator 35. A phase comparison error output sampled and held at the phase comparator 36, is applied to a terminal N of the switch 28.

During the high-speed search reproduction mode, the signal from the phase comparator 36 is not supplied to the mixing amplifier 29 because the switches 28 and 37 are respectively connected to the terminal H. Therefore, the rotational control is not used. However, as described above, the output signal e of the frequency divider 39 and the output signal b of the flip-flop 34 continue to be in phase synchronism during the high-speed search reproduction mode.

Next, a description will be given with respect to the operation when the mode is switched over to the normal reproduction mode from the high-speed search reproduction mode. During the normal reproduction mode, the movable contacts of the switches 28 and 37 are connected to respective terminals N. As the connection of the switch 28 is switched over and connected to the terminal N, the loop including the F/V converter 26 is cut off, and the output of the phase comparator 36 becomes connected to the mixing amplifier 29. In addition, by the connection of the switch 37 to the terminal N (this terminal N is dead or idle), the frequency divider 39 no longer becomes reset by the signal b, and the signals e and b become out of phase synchronism.

The trapezoidal wave c obtained by use of the signal b, is supplied to the phase comparator 36. On the other hand, the signal f obtained from the signal e, which is obtained by frequency-dividing the reference frequency signal d, is supplied to the pulse generator 41, and the signal g accordingly generated by the pulse generator 41 is supplied to the phase comparator 36. The output phase comparison error signal from the phase comparator 36 is supplied to the mixing amplifier 29 through the switch 28, and mixed with the signal from the F/V converter 31. The output of the mixing amplifier 29 is supplied to the drum motor 16. The head servo operation during the normal reproduction is the same as that performed by the conventional circuit.

However, during the high-speed search reproduction mode, the frequency-divided signal e and the signal b are in phase synchronism as described above, even immediately before the mode is switched over to the normal reproduction mode from the high-speed search reproduction mode. Further, the phase relationship between the trapezoidal wave c and the sampling pulse g supplied to the phase comparator 36 is the same as the phase relationship between the trapezoidal wave c and the sampling pulse g in a state where the head servo circuit is locked during the normal reproduction. Accordingly, when the connections of the switches 28 and 37 are switched over to the respective terminals N from the terminals H as the mode is switched over to the normal reproduction mode from the high-speed search reproduction mode, the head servo circuit becomes locked in with respect to the drum motor 16 instantaneously or within an exceedingly short period of time. Therefore, according to the circuit of the present invention, horizontal synchronism continues to be maintained in the reproduced picture at the receiver when the mode is switched over to the normal reproduction mode from the high-speed search reproduction mode. As a result, inconveniences such as an irregular picture introduced in the conventional circuit because the horizontal synchronism cannot be maintained during the above switching of the mode, are prevented from occurring.

In the above described embodiment of the invention, the phase synchronism between the signals e and b is obtained by resetting the frequency divider 39 by the signal b. However, as a modification, the phase synchronism may be obtained between the signals d and b by controlling the oscillation operation of the reference signal oscillator 38 by the signal b. Moreover, in the above embodiment and modification, the signal a or a signal such as a vertical synchronizing signal separated and obtained from the reproduced video signal, for example, which is in phase synchronism with the signal b, may be used instead of the signal b.

In addition, during a special reproduction mode besides the high-speed search reproduction mode such as a slow-motion reproduction mode, a multiple-speed reproduction mode, and a still picture reproduction mode, the servo operation carried out with respect to the rotary heads is the same as the servo operation carried out during the normal reproduction mode. Accordingly, the circuit according to the present invention can also be applied with the mode is switched over to the above special reproduction mode from the high-speed search reproduction mode.

Further, the present invention is not limited to these embodiments, but various variations and modifications may be made without departing from the scope of the present invention.

What is claimed is:
1. A head servo circuit in a magnetic reproducing apparatus comprising rotary heads for reproducing a video signal recorded on tracks formed obliquely with respect to the longitudinal direction of a magnetic tape, a motor for rotating said rotary heads, and magnetic tape traveling means for causing said magnetic tape to travel at a high speed during a high-speed reproduction mode and, upon a mode switching, causing said magnetic tape to travel at a speed corresponding to a mode other than said high-speed reproduction mode, said head servo circuit comprising:
   detecting means for detecting the rotation of said motor and producing a signal in accordance with the detected rotation;
   reference frequency signal generating means for generating a reference frequency signal;
   phase comparing means for comparing phases of the reference frequency signal generated by said reference frequency signal generating means and the signal from said detecting means;

control means for controlling the rotation of said motor by an output signal of said phase comparing means during a mode other than the high-speed reproduction mode;

cut off means for cutting off the supply of the output signal of said phase comparing means to said control means during the high-speed reproduction mode; and synchronizing means for obtaining phase synchronism between the reference frequency signal generated by said reference frequency signal generating means and the signal from said detecting means during the high-speed reproduction mode.

2. A head servo circuit as claimed in claim 1 in which said reference frequency signal generating means comprises a reference oscillator for producing a predetermined frequency signal, and a frequency divider reset by a reset signal, for frequency-dividing an output signal of said reference oscillator, and said synchronizing means comprises means for supplying the signal from said detecting means to said frequency divider as said reset signal only during the high-speed reproduction mode.

3. A head servo circuit as claimed in claim 1 which further comprises means for obtaining a signal in accordance with a rotational frequency of said motor, and means for separating a horizontal synchronizing signal from a video signal reproduced by said rotary heads and obtaining a signal in accordance with the frequency of the reproduced horizontal synchronizing signal, said control means comprising means for mixing the signal in accordance with the rotational frequency of said motor and the signal in accordance with the frequency of said reproduced horizontal synchronizing signal to control the rotation of said motor during the high-speed reproduction mode, and mixing the signal in accordance with the rotational frequency of said motor and the output signal of said phase comparing means to control the rotation of said motor during a mode other than the high-speed reproduction mode.

4. A head servo circuit as claimed in claim 3 in which said control means comprises first switch means switched so as to pass the signal in accordance with said reproduced horizontal synchronizing signal during the high-speed reproduction mode and pass the output signal of said phase comparing means during a mode other than said high-speed reproduction mode, and means for mixing an output signal of said first switch means and the signal in accordance with the rotational frequency of said motor and applying a mixed output to said motor, and said synchronizing means comprises second switch means switched together with said first switch means, for supplying the output signal of said detecting means to said reference frequency signal generating means so as to obtain phase synchronism during the high-speed reproduction mode and cutting off said supply of the output signal of said detecting means to said reference frequency signal generating means during a mode other than said high-speed reproduction mode.

5. A head servo circuit as claimed in claim 2 in which said frequency divider comprises a counter reset of the counting operation by the signal from said detecting means.

* * * * *